(12) United States Patent
Blackburn

(10) Patent No.: US 7,438,315 B2
(45) Date of Patent: Oct. 21, 2008

(54) INFLATOR AND METHOD OF ASSEMBLY

(75) Inventor: Jeffery S. Blackburn, Lake Orion, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 153 days.

(21) Appl. No.: 11/140,055

(22) Filed: May 27, 2005

(65) Prior Publication Data
US 2005/0263993 A1  Dec. 1, 2005

Related U.S. Application Data
(60) Provisional application No. 60/575,530, filed on May 28, 2004.

(51) Int. Cl.
B60R 21/26 (2006.01)
(52) U.S. Cl. ........................................ 280/741; 280/736
(58) Field of Classification Search ................. 280/742, 280/741, 736, 737
See application file for complete search history.

(56) References Cited
U.S. PATENT DOCUMENTS

| 2,891,525 | A | 6/1959 | Moore | 123/90.51 |
|---|---|---|---|---|
| 3,794,347 | A | 2/1974 | Zens | 280/150 |
| 3,877,882 | A | 4/1975 | Lette et al. | |
| 3,880,447 | A | 4/1975 | Thorn et al. | |
| 3,958,949 | A | 5/1976 | Plantif et al. | |
| 3,985,076 | A | 10/1976 | Schneiter et al. | |
| 4,001,750 | A | 1/1977 | Scherer et al. | 337/280 |
| 4,012,189 | A | 3/1977 | Vogt et al. | 431/353 |
| 4,215,631 | A | 8/1980 | Rucker | 102/27 |
| 4,530,516 | A | 7/1985 | Adams et al. | 280/741 |
| 4,611,374 | A | 9/1986 | Schnelle et al. | 29/890.13 |
| 4,722,551 | A | 2/1988 | Adams | |
| 4,730,558 | A | 3/1988 | Florin et al. | 102/218 |

(Continued)

FOREIGN PATENT DOCUMENTS
DE  40 19 877 A1  6/1990

(Continued)

OTHER PUBLICATIONS
U.S. Appl. No. 11/251,255.

(Continued)

Primary Examiner—Eric Culbreth
(74) Attorney, Agent, or Firm—L.C. Begin & Associates, PLLC.

(57) ABSTRACT

A gas generating system (10) includes a base (14) and a cap (16), one of the base (14) and the cap (16) having at least one groove (34) formed therealong to enable fluid communication between a combustion chamber (18) of the gas generator and an exterior of the combustion chamber (18). The other one of the base (14) and the cap (16) covers the at least one groove (34) to define at least one enclosed passage (36) extending along the at least one groove (34) for enabling fluid communication between the combustion chamber (18) and the exterior of the combustion chamber. In another aspect, a gas generant composition (20) having an auto-ignition temperature is positioned within the gas generating system (10). An adhesive composition (30) having a decomposition temperature lower than the gas generant auto-ignition temperature secures the cap (16) to the base (14).

21 Claims, 3 Drawing Sheets

U.S. PATENT DOCUMENTS

| | | | |
|---|---|---|---|
| 4,762,067 A | 8/1988 | Barker et al. ............... 102/313 |
| 4,886,293 A | 12/1989 | Weiler et al. |
| 4,950,458 A | 8/1990 | Cunningham ............... 422/164 |
| 5,003,887 A * | 4/1991 | Unterforsthuber et al. .. 102/531 |
| 5,028,070 A | 7/1991 | Bender |
| 5,048,862 A | 9/1991 | Bender et al. |
| 5,100,171 A | 3/1992 | Faigle et al. ................ 280/736 |
| 5,215,721 A | 6/1993 | Tasaki et al. |
| 5,294,244 A | 3/1994 | Allerton, III et al. .......... 75/401 |
| 5,318,323 A | 6/1994 | Pietz |
| 5,333,656 A | 8/1994 | Mackal ....................... 141/330 |
| 5,340,150 A | 8/1994 | Harada et al. |
| 5,372,449 A | 12/1994 | Bauer et al. ................. 403/273 |
| 5,387,009 A | 2/1995 | Lauritzen et al. |
| 5,406,889 A | 4/1995 | Letendre et al. |
| 5,443,286 A | 8/1995 | Cunningham et al. |
| 5,466,420 A | 11/1995 | Parker et al. |
| 5,509,686 A | 4/1996 | Shepherd et al. ............ 280/738 |
| 5,516,147 A | 5/1996 | Clark et al. ................. 280/737 |
| 5,533,751 A | 7/1996 | Kort et al. ................... 280/737 |
| 5,556,439 A | 9/1996 | Rink et al. .................... 55/487 |
| 5,562,304 A | 10/1996 | Gest |
| 5,564,743 A | 10/1996 | Marchant .................... 280/741 |
| 5,582,427 A | 12/1996 | Rink et al. ................... 280/740 |
| 5,588,676 A | 12/1996 | Clark et al. ................. 280/741 |
| 5,609,360 A | 3/1997 | Faigle et al. ................ 280/740 |
| 5,611,566 A | 3/1997 | Simon et al. ................ 280/736 |
| 5,613,703 A | 3/1997 | Fischer ...................... 280/741 |
| 5,622,380 A | 4/1997 | Khandhadia et al. ........ 280/736 |
| 5,624,133 A | 4/1997 | Wong |
| 5,624,134 A | 4/1997 | Iwai et al. |
| 5,628,528 A | 5/1997 | DeSautelle et al. .......... 280/736 |
| 5,630,619 A | 5/1997 | Buchanan et al. ........... 280/741 |
| 5,662,722 A | 9/1997 | Shiban ........................ 55/413 |
| 5,702,494 A | 12/1997 | Tompkins et al. ............. 55/498 |
| 5,725,245 A | 3/1998 | O'Driscoll et al. |
| 5,799,973 A | 9/1998 | Bauer et al. ................. 280/741 |
| 5,813,695 A | 9/1998 | O'Driscoll et al. |
| 5,829,785 A | 11/1998 | Jordan et al. ................ 280/741 |
| 5,845,935 A | 12/1998 | Enders et al. ............. 280/743.2 |
| 5,860,672 A | 1/1999 | Petersen .................. 280/728.2 |
| 5,872,329 A | 2/1999 | Burns et al. ................... 149/36 |
| 5,934,705 A | 8/1999 | Siddiqui et al. ............. 280/736 |
| 5,941,562 A | 8/1999 | Rink et al. ................... 280/741 |
| 5,970,880 A | 10/1999 | Perotto ....................... 102/531 |
| 6,019,389 A | 2/2000 | Burgi et al. ................. 280/736 |
| 6,032,979 A | 3/2000 | Mossi et al. ................ 280/741 |
| 6,074,502 A | 6/2000 | Burns et al. |
| 6,095,556 A | 8/2000 | Bailey et al. ............... 280/737 |
| 6,095,559 A | 8/2000 | Smith et al. |
| 6,095,561 A | 8/2000 | Siddiqui et al. ............. 280/472 |
| 6,106,000 A | 8/2000 | Stewart .................... 280/728.2 |
| 6,116,491 A | 9/2000 | Katoh .......................... 228/42 |
| 6,149,192 A * | 11/2000 | Swann et al. ................ 280/740 |
| 6,149,193 A | 11/2000 | Canterberry et al. ........ 280/741 |
| 6,210,505 B1 | 4/2001 | Khandhadia et al. .......... 149/36 |
| 6,244,623 B1 | 6/2001 | Moore et al. ................ 280/741 |
| 6,364,353 B2 * | 4/2002 | Green et al. ................. 280/736 |
| 6,379,627 B1 | 4/2002 | Nguyen et al. |
| 6,464,254 B2 | 10/2002 | Chikaraishi et al. ......... 280/741 |
| 6,474,684 B1 | 11/2002 | Ludwig et al. |
| 6,485,051 B1 | 11/2002 | Taguchi et al. |
| 6,532,408 B1 * | 3/2003 | Breed .......................... 701/45 |
| 6,581,963 B2 | 6/2003 | Mangun ..................... 280/741 |
| 6,709,012 B1 | 3/2004 | Tanaka et al. |
| 6,764,096 B2 | 7/2004 | Quioc |
| 6,776,434 B2 | 8/2004 | Ford et al. ................... 280/729 |
| 6,846,014 B2 | 1/2005 | Rink et al. ................... 280/740 |
| 6,851,705 B2 | 2/2005 | Young et al. |
| 6,860,510 B2 | 3/2005 | Ogawa et al. ............... 280/736 |
| 6,871,873 B2 | 3/2005 | Quioc et al. ................. 280/741 |
| 6,908,104 B2 | 6/2005 | Canterbery et al. ......... 280/736 |
| 6,929,284 B1 | 8/2005 | Saso et al. |
| 6,935,655 B2 | 8/2005 | Longhurst et al. ........... 280/736 |
| 6,945,561 B2 | 9/2005 | Nakashima et al. |
| 6,948,737 B2 | 9/2005 | Ohji et al. |
| 6,976,702 B2 | 12/2005 | Yokota et al. ............. 280/730.2 |
| 7,073,820 B2 | 7/2006 | McCormick ................ 280/741 |
| 7,178,830 B2 | 2/2007 | Blackburn .................. 280/736 |
| 7,237,801 B2 | 7/2007 | Quioc et al. ................. 280/736 |
| 7,267,365 B2 | 9/2007 | Quioc ......................... 280/736 |
| 2002/0053789 A1 | 5/2002 | Fujimoto |
| 2003/0127840 A1 | 7/2003 | Nakashima et al. |
| 2003/0155757 A1 | 8/2003 | Larsen et al. |
| 2003/0201628 A1 | 10/2003 | Choudhury et al. ......... 280/729 |
| 2004/0046373 A1 | 3/2004 | Wang et al. |
| 2004/0232680 A1 * | 11/2004 | Goetz ......................... 280/742 |
| 2005/0001414 A1 | 1/2005 | Matsuda et al. ............. 280/736 |
| 2005/0134031 A1 | 6/2005 | McCormick |
| 2005/0161925 A1 | 7/2005 | Blackburn .................. 280/741 |
| 2005/0194772 A1 | 9/2005 | Numoto et al. ............. 280/741 |
| 2005/0230949 A1 | 10/2005 | Blackburn |
| 2005/0263993 A1 | 12/2005 | Blackburn |
| 2005/0263994 A1 | 12/2005 | Quioc |
| 2005/0280252 A1 | 12/2005 | McCormick |
| 2006/0005734 A1 | 1/2006 | McCormick |
| 2006/0043716 A1 | 3/2006 | Quioc |
| 2006/0082112 A1 | 4/2006 | Blackburn .................. 280/736 |
| 2006/0261584 A1 | 11/2006 | Blackburn .................. 280/741 |
| 2006/0273564 A1 | 12/2006 | McCormick et al. ........ 280/740 |
| 2007/0001438 A1 | 1/2007 | Patterson et al. ............ 280/740 |

FOREIGN PATENT DOCUMENTS

| | | |
|---|---|---|
| DE | 42 27 547 A1 | 2/1994 |
| EP | 0602785 B1 | 10/1993 |
| EP | 0728633 A1 | 2/1996 |
| EP | 0844149 A1 | 11/1997 |
| EP | 0 864 470 A1 | 9/1998 |
| EP | 1122134 B1 | 7/2000 |
| EP | 1308353 A2 | 9/2002 |
| JP | 04055151 A | 2/1992 |
| JP | 05096147 | 4/1993 |
| JP | 05178155 A | 7/1993 |
| JP | 05178156 A | 7/1993 |
| JP | 06227358 A | 8/1994 |
| WO | WO 98/39183 | 9/1998 |
| WO | WO 2004/091982 A1 | 10/2004 |
| WO | WO 2005/058645 A2 | 6/2005 |
| WO | WO 2005/086917 | 9/2005 |
| WO | WO 2006/044516 A2 | 4/2006 |
| WO | WO 2006/078819 A2 | 7/2006 |

OTHER PUBLICATIONS

U.S. Appl. No. 11/358,786.

* cited by examiner

INFLATOR AND METHOD OF ASSEMBLY

CROSS REFERENCE TO RELATED APPLICATIONS

This application claims the benefit of provisional application Ser. No. 60/575,530 filed on May 28, 2004.

BACKGROUND OF THE INVENTION

The present invention relates to gas generating systems used, for example, to inflate air bags in a vehicle occupant protection system and, more particularly, to an improved gas generating system that features a more efficient method of assembly.

Gas generating systems for deploying an air bag in a motor vehicle generally employ a gas generator in fluid communication with an uninflated air bag. A firing circuit typically triggers the gas generating system when the sensed vehicle acceleration exceeds a predetermined threshold value, as through the use of an acceleration-responsive inertial switch. In many designs, the gas generating system is assembled by welding the housing to other components integrated therein.

The gas generator housing must be pierced or perforated with gas exit orifices to permit egress of gases produced upon gas generator activation. Formation in metal housing components of small diameter holes (i.e., holes having a diameter less than twice the thickness of the metal from which the component is formed) result in high punch wear and increased breakage of punches, resulting in higher tooling costs. Also, when welding, precautions must be taken to ensure that the gas generator housing is not excessively heated to prevent auto ignition of the gas generant contained within. Furthermore, the cost and complexity of welded designs is necessarily increased. In addition, in gas generator housings formed from housing portions secured together in a nested relationship, gas exit orifices formed in one of the housing portions must often be aligned with gas exit orifices formed in the other housing portion in order for the gas to properly exit the housing. This need for alignment between the two sets of gas exit orifices can increase the time and fixture costs required for gas generator assembly. In view of the above, a gas generator design not requiring a welded or pierced assembly would therefore be an improvement in the art.

SUMMARY OF THE INVENTION

In one aspect of the present invention, a gas generating system is provided which includes a first member and a second member, one of the first member and the second member having at least one groove formed therealong to enable fluid communication between a combustion chamber of the gas generator and an exterior of the combustion chamber. The other one of the first member and the second member covers the at least one groove to define an enclosed passage extending along the at least one groove for enabling fluid communication between the combustion chamber and the exterior of the combustion chamber.

In another aspect of the present invention, a gas generating system is provided which includes a first member and a second member. A gas generant composition having an auto-ignition temperature is positioned within the gas generating system. An adhesive composition having a decomposition temperature secures the second member to the first member. The decomposition temperature of the adhesive composition is lower than the auto-ignition temperature of the gas generant composition.

A method for manufacturing a gas generating system is also provided which comprises the steps of providing a first member having at least one groove formed therealong; providing a second member adapted for affixation to the first member; and affixing the second member to the first member such that at least a portion of the second member covers the at least one groove in the first member, thereby defining an enclosed passage extending along the at least one groove for enabling fluid communication between an interior of the gas generating system and an exterior of the gas generating system.

The present invention also contemplates a vehicle occupant protection system incorporating a gas generating system as described herein. The vehicle occupant protection system includes an airbag system with an airbag coupled to the gas generating system so as to enable fluid communication with the gas generating system.

DETAILED DESCRIPTION

Figure 1:
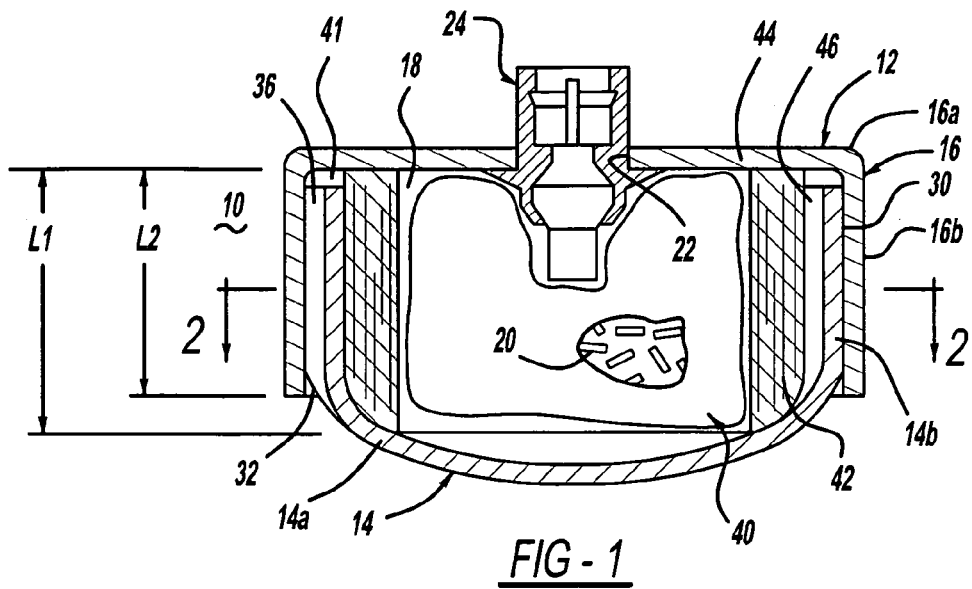
FIG. 1 is a cross-sectional side view of a first embodiment of a gas generating system in accordance with the present invention.
Figure 2:
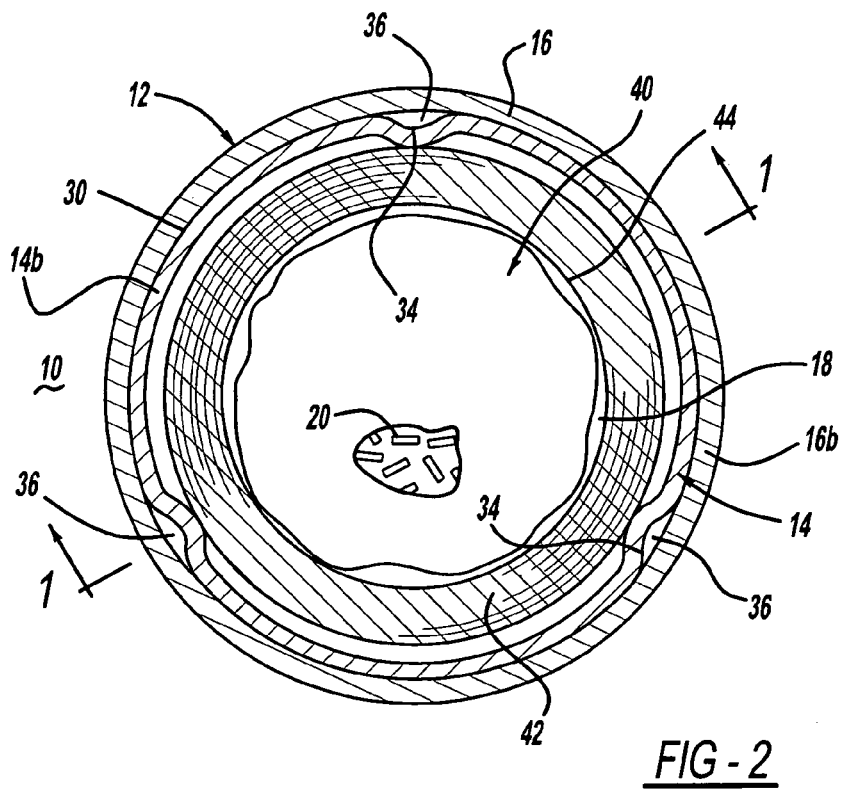
FIG. 2 is a cross-sectional top view of the gas generating system shown in FIG. 1.

FIGS. 1 and 2 show cross-sectional views of one embodiment of a gas generating system 10 in accordance with the present invention. As seen in FIGS. 1 and 2, gas generating system 10 includes a housing 12 formed from a base 14 and a cap 16 affixed to base 14. Base 14 has a base portion 14a and a wall 14b extending from a circumference of base portion 14a. Similarly, cap 16 has a base portion 16a and a wall 16b extending from a circumference of base portion 16a. Base 14 and cap 16 may be drawn, extruded, stamped, die cast, or otherwise formed by methods known in the art. Base 14 and cap 16 are preferably formed from carbon steel, aluminum, or other materials as known in the art. Base 14 and cap 16 may be obtained from known suppliers such as Globe Tool of Minneapolis, Minn., for example. In the embodiment shown in FIGS. 1 and 2, a portion of base wall 14b is received within cap 16 to define a combustion chamber 18 within housing 12. Also in the embodiment shown in FIGS. 1 and 2, base 14 and cap 16 are affixed to each other along one or more interfaces between base wall 14b and cap wall 16b by an adhesive composition 30 applied to appropriate surfaces of base 14 and/or cap 16.

Referring to FIG. 1, gas exit orifices 32 are provided along an exterior of housing 12 for communicating a gas formed in combustion chamber 18 to an exterior of the gas generating system, where the gases may be employed, for example, to inflate an inflatable element of a vehicle occupant protection system.

To increase the effective surface area of the base/cap interface available for adhesive application, a novel method is provided for forming gas exit orifices 32. Referring to FIGS. 1 and 2, rather than piercing base 14 and/or cap 16 with gas exit orifices as in conventional gas generator designs, a plurality of grooves 34 are preferably formed coextensive with the length of housing 12 by forming grooves along the length of wall 14b of base 14. As seen in FIGS. 1 and 2, grooves 34 open radially outwardly and can be formed during the drawing, stamping, extruding, or other metal forming process used to form base 14. As seen in FIGS. 1 and 2, when base 14 is inserted into cap 16, wall 16b of cap 16 covers grooves 34 to define a series of enclosed passages 36 extending along sides of housing 12 to enable fluid communication between combustion chamber 18 and the exterior of gas generating system 10.

Figure 6:
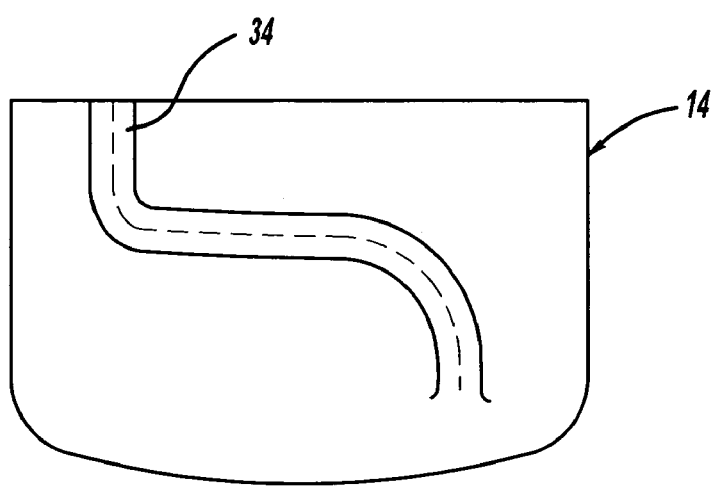
FIG. 6 is a shematic illustration of a tortuous path for the passage.

In the embodiment shown in FIGS. 1 and 2, grooves 34 and the associated enclosed passages 36 are substantially straight. In a particular embodiment shown schematically in FIG. 6, grooves 34 and passages 36 are formed to curve along the side of housing 12, thereby providing tortuous flow pathways for gas generated in combustion chamber 18 to the exterior of the gas generating system. By forming tortuous rather than straight passages, gas generating system performance features such as the time between activation of the gas generating system and the exit of gas from the system, the degree of cooling of the gases, and the pressure drop of the gases transiting the passages may be controlled. In FIG. 6, an example of a tortuous groove is shown formed along an outer wall of base 14. In another embodiment (not shown), one or more tortuous grooves are formed in cover 16.

In addition, the cross-sectional area of each groove 34 (and, therefore, each passage 36) may be controlled during groove formation so as to affect, in a desired manner, the volumetric flow rate of gas through the passages.

Figure 3:
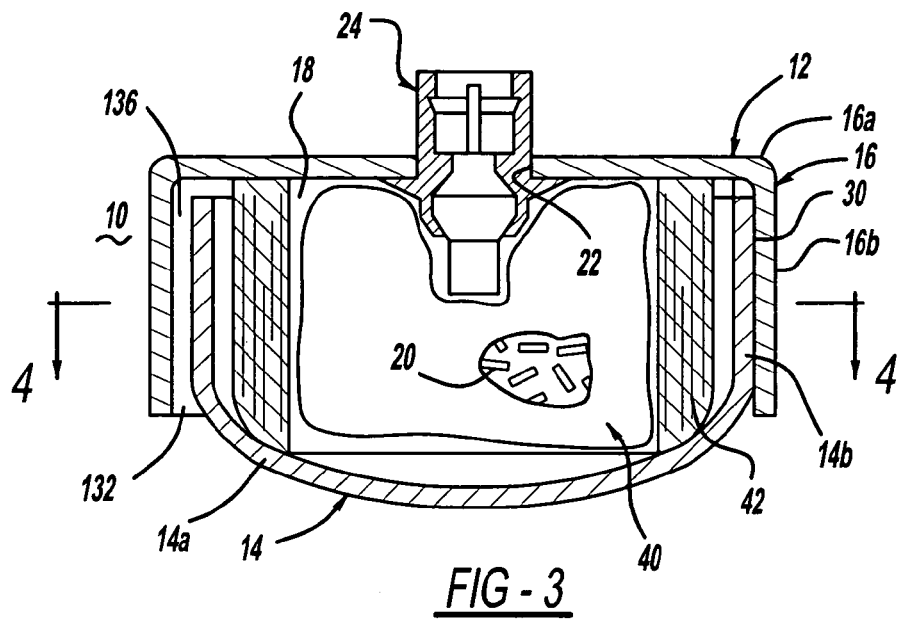
FIG. 3 is a cross-sectional side view of a second embodiment of a gas generating system in accordance with the present invention.
Figure 4:
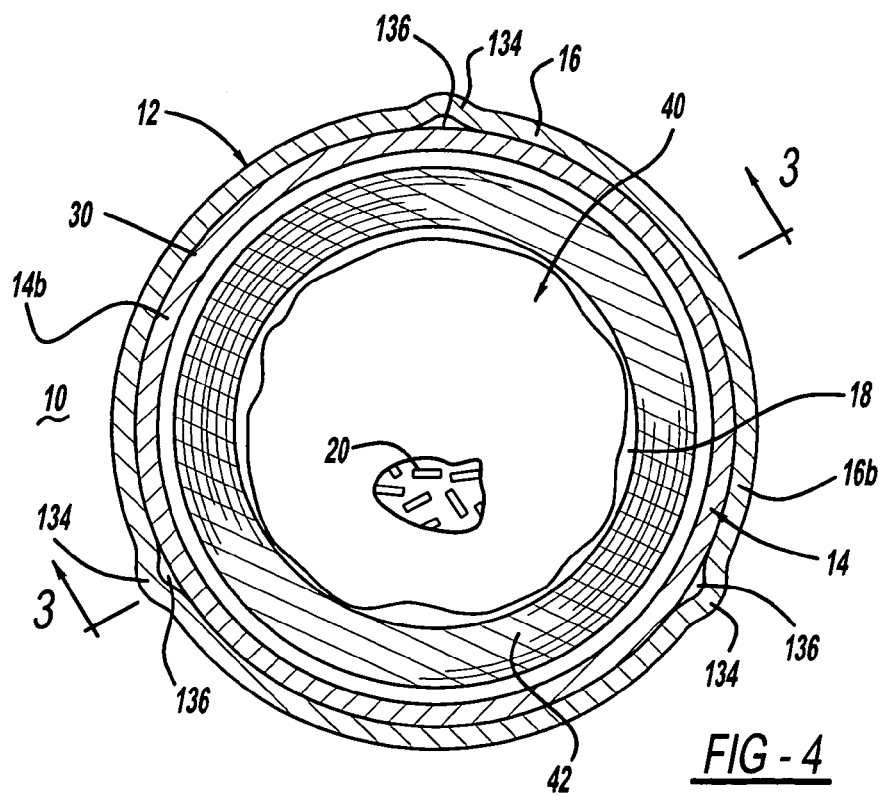
FIG. 4 is a cross-sectional top view of the gas generating system shown in FIG. 3.

Referring to FIGS. 3 and 4, in another alternative embodiment, a plurality of grooves 134 are formed coextensive with the length of housing 12 by forming grooves along the length of wall 16b of cap 16. As seen in FIGS. 3 and 4, when base 14 is inserted into cap 16, wall 14b of base 14 covers grooves 134 formed in cap 16 to define a series of enclosed passages 136 extending along sides of housing 12 to provide gas exit orifices 132 which enable fluid communication between combustion chamber 18 and the exterior of gas generating system 10.

Referring again to FIGS. 1 and 2, a gas generant composition 20 is contained within combustion chamber 18 and is manufactured as known in the art. The gas generant composition 20 may be any gas generant known to be useful in the art. Preferable gas generant compositions may, for example, be in pelletized form and include but are not limited by those described in co-owned U.S. Pat. Nos. 5,035,757; 5,872,329 and 6,210,505 the teachings of which are incorporated herein by reference. In the embodiment shown in FIGS. 1 and 2, gas generant composition 20 is hermetically sealed within a pouch 40 formed from a material (for example, Mylar®) that is substantially moisture and gas impermeable. Upon activation of the gas generator, pouch 40 is perforated by, for example, flame and combustion products resulting from activation of an igniter assembly 22 (described in greater detail below), thereby exposing the gas generant for subsequent combustion.

U.S. Pat. No. 5,037,757 discloses azide-free gas generants including tetrazole compounds such as aminotetrazole, tetrazole, bitetrazole and metal salts of these compounds, as well as triazole compounds such as 1,2,4-triazole-5-one or 3-nitro 1,2,4-triazole-5-one and metal salts of these compounds. Certain metal salts (alkaline earth metals) of these compounds can function, at least in part, as high temperature slag formers. For example, the calcium salt of tetrazole or bitetrazole forms, upon combustion, calcium oxide which would function as a high-temperature slag former. Magnesium, strontium, barium and possibly cerium salts would act in similar manner. In combination with a low-temperature slag former, a filterable slag would be formed. The alkali metal salts (lithium, sodium, potassium) could be considered, at least in part, as low-temperature slag formers since they could yield lower melting silicates or carbonates upon combustion.

Oxidizers generally supply all or most of the oxygen present in the system. In addition, however, they are the preferred method of including a high-temperature slag former into the reaction system. The alkaline earth and cerium nitrates are all oxidizers with high-temperature slag forming potential, although most of these salts are hygroscopic and are difficult to use effectively. Strontium and barium nitrates are easy to obtain in the anhydrous state and are excellent oxidizers. Alkali metal nitrates, chlorates and perchlorates are other useful oxidizers when combined with a high-temperature slag former.

Materials which function as high-temperature slag formers have melting points at, or higher, than the combustion temperature or decompose into compounds which have melting points, at or higher, than the combustion temperature. The alkaline earth oxides, hydroxides and oxalates are useful high-temperature slag formers. Magnesium carbonate and magnesium hydroxide are very useful high-temperature slag formers because they decompose before melting to form magnesium oxide which has a very high melting point (2800° C.). As mentioned above, oxidizers such as strontium nitrate are especially beneficial since they serve both as high-temperature slag former and oxidizer, thereby increasing the amount of gas produced per unit weight.

Metal salts as fuels, such as the calcium or strontium salt of 5-aminotetrazole, tetrazole, or ditetrazole are also useful high-temperature slag formers, although not as efficient as the oxidizers. Other metal oxides having high melting points such as the oxides of titanium, zirconium and cerium are also useful high-temperature slag formers.

Materials which function as low-temperature slag formers have melting points at or below the combustion temperature or form compounds during combustion which have melting points at or below the combustion temperature. Compounds such as silicon dioxide ($SiO_2$), boric oxide ($B_2O_3$), vanadium pentoxide ($V_2O_5$), sodium silicate ($Na_2SiO_3$), potassium silicate ($K_2SiO_3$), sodium carbonate ($Na_2CO_3$) and potassium carbonate ($K_2CO_3$) are examples of low-temperature slag formers.

Set in the above context, an exemplary pyrotechnic, slag forming gas generating mixture may comprise at least one each of the following materials.

a. A fuel selected from the group of tetrazole compounds consisting of aminotetrazole, tetrazole, bitetrazole and metal salts of these compounds as well as triazole compounds and metal salts of triazole compounds.

b. An oxygen containing oxidizer compound selected from the group consisting of alkali metal, alkaline earth metal, lanthanide and ammonium nitrates and perchiorates or from the group consisting of alkali metal or alkaline earth metal chlorates or peroxides.

c. A high temperature slag forming material selected from the group consisting of alkaline earth metal or transition metal oxides, hydroxides, carbonates, oxalates, peroxides, nitrates, chlorates and perchlorates or from the group consisting of alkaline earth metal salts of tetrazoles, bitetrazoles and triazoles.

d. A low-temperature slag forming material selected from the group consisting of silicon dioxide, boric oxide and vanadium pentoxide or from the group consisting of alkali metal silicates, borates, carbonates, nitrates, perchlorates or chlorates or from the group consisting of alkali metal salts of tetrazoles, bitetrazoles and triazoles or from the group consisting of the various naturally occurring clays and talcs.

In practice, certain of the materials may be substituted or interchanged. Specifically, both the fuel and the high-temperature slag forming material may be selected from the group consisting of alkaline earth metal salts of tetrazoles, bitetrazoles and triazoles. Both the oxygen containing oxidizer compound and high-temperature slag forming material may be comprised of one or more of the group consisting of alkaline earth metal and lanthanide nitrates, perchlorates, chlorates and peroxides. Both the fuel and the low-temperature slag forming material may comprise one or more of the group consisting of alkali metal salts of tetrazoles, bitetrazoles and triazoles. Both the oxygen containing oxidizer compound and the low-temperature slag forming material may comprise one or more of the group consisting of alkali metal nitrates, perchlorates, chlorates and peroxides.

The fuel may comprise 5-aminotetrazole which is present in a concentration of about 22 to about 36% by weight, where the oxygen containing oxidizer compound and high-temperature slag former is strontium nitrate which is present in a concentration of about 38 to about 62% by weight, and said low-temperature slag former is silicon dioxide which is present in a concentration of about 2 to about 18% by weight.

Alternatively, the fuel and high-temperature slag forming material may comprise the strontium salt of 5-aminotetrazole which is present in a concentration of about 30 to about 50% by weight, where the oxygen containing oxidizer compound is potassium nitrate which is present in a concentration of about 40 to about 60% by weight, and the low-temperature slag former is talc which is present in a concentration of about 2 to about 10% by weight. The talc may be replaced by clay.

Another combination comprises the 5-aminotetrazole which is present in a combination of about 22 to about 36% by weight, where the oxygen containing oxidizer compound is sodium nitrate which is present in a concentration of about 30 to about 50% by weight, the high-temperature slag forming material is magnesium carbonate which is present in a concentration of about 8 to about 30% by weight, and the low-temperature slag former is silicon dioxide which is present in a concentration of about 2 to about 20% by weight. Magnesium carbonate may be replaced by magnesium hydroxide.

Yet another combination comprises the potassium salt of 5-aminotetrazole which is present in a concentration of about 2 to about 30% by weight which serves in part as a fuel and in part as a low-temperature slag former and wherein 5-aminotetraozle in a concentration of about 8 to about 40% by weight also serves as a fuel, and wherein clay in a concentration of about 2 to about 10% by weight serves in part as the low-temperature slag former and wherein strontium nitrate in a concentration of about 40 to about 66% by weight serves as both the oxygen containing oxidizer and high-temperature slag former.

U.S. Pat. No. 5,872,329 discloses nonazide gas generants for a vehicle passenger restraint system employing ammonium nitrate as an oxidizer and potassium nitrate as an ammonium nitrate phase stabilizer. The fuel, in combination with phase stabilized ammonium nitrate, is selected from the group consisting of amine salts of tetrazoles and triazoles having a cationic amine component and an anionic component. The anionic component comprises a tetrazole or triazole ring, and an R group substituted on the 5-position of the tetrazole ring, or two R groups substituted on the 3- and 5-positions of the triazole ring. The R group(s) is selected from hydrogen and any nitrogen-containing compounds such as amino, nitro, nitramino, tetrazolyl and triazolyl groups. The cationic amine component is selected from an amine group including ammonia, hydrazine, guanidine compounds such as guanidine, aminoguanidine, diaminoguanidine, triaminoguanidine, dicyandiamide, nitroguanidine, nitrogen subsituted carbonyl compounds such as urea, carbohydrazide, oxamide, oxamic hydrazide, bis-(carbonamide) amine, azodicarbonamide, and hydrazodicarbonamide, and amino azoles such as 3-amino-1,2,4-triazole, 3-amino-5-nitro-1,2,4-triazole, 5-aminotetrazole and 5-nitraminotetrazole. Optional inert additives such as clay or silica may be used as a binder, slag former, coolant or processing aid. Optional ignition aids comprised of nonazide propellants may also be utilized in place of conventional ignition aids such as $BKNO_3$. The gas generants are prepared by dry blending and compaction of the comminuted ingredients.

Other high nitrogen nonazides that may be employed as primary fuels in gas generant compositions include, in particular, amine salts of tetrazole and triazole selected from the group including monoguanidinium salt of 5,5'-Bis-1H-tetrazole (BHT·1GAD), diguanidinium salt of 5,5'-Bis-1H-tetrazole (BHT·2GAD), monoaminoguanidinium salt of 5,5'-Bis-1H-tetrazole (BHT·1AGAD), diaminoguanidinium salt of 5,5'-Bis-1H-tetrazole (BHT·2AGAD), monohydrazinium salt of 5,5'-Bis-1H-tetrazole (BHT·1HH), dihydrazinium salt of 5,5'-Bis-1H-tetrazole (BHT·2HH), monoammonium salt of 5,5'-bis-1H-tetrazole (BHT·1NH.sub.3), diammonium salt of 5,5'-bis-1H-tetrazole (BHT·2NH$_3$), mono-3-amino-1,2,4-triazolium salt of 5,5'-bis-1H-tetrazole (BHT·1ATAZ), di-3-amino-1,2,4-triazolium salt of 5,5'-bis-1H-tetrazole (BHT·2ATAZ), diguanidinium salt of 5,5'-Azobis-1H-tetrazole (ABHT·2GAD), and monoammonium salt of 5-Nitramino-1H-tetrazole (NAT·1NH$_3$). The nonazide fuel generally comprises 15-65%, and preferably comprises 20-55%, by weight of the total gas generant composition.

The foregoing amine salts of tetrazole or triazole are dry-mixed with phase stabilized ammonium nitrate. The oxidizer is generally employed in a concentration of about 35 to 85% by weight of the total gas generant composition. The ammonium nitrate is stabilized by potassium nitrate, as taught in co-owned U.S. Pat. No. 5,531,941, entitled, "Process For Preparing Azide-Free Gas Generant Composition", and granted on Jul. 2, 1996, incorporated herein by reference. The PSAN comprises 85-90% AN and 10-15% KN and is formed by any suitable means such as co-crystallization of AN and KN, so that the solid-solid phase changes occurring in pure ammonium nitrate (AN) between −40° C. and 107° C. are prevented. Although KN is preferably used to stabilize pure AN, one skilled in the art will readily appreciate that other stabilizing agents may be used in conjunction with AN.

If a slag former, binder, processing aid, or coolant is desired, inert components such as clay, diatomaceous earth, alumina, or silica are provided in a concentration of 0.1-10% of the gas generant composition, wherein toxic effluents generated upon combustion are minimized.

Optional ignition aids, used in conjunction with the present invention, are selected from nonazide gas generant compositions comprising a fuel selected from a group including triazole, tetrazolone, aminotetrazole, tetrazole, or bitetrazole, or others as described in U.S. Pat. No. 5,139,588 to Poole, the teachings of which are herein incorporated by reference. Conventional ignition aids such as $BKNO_3$ are not required because the tetrazole or triazole based fuel, when combined with phase stabilized ammonium nitrate, significantly improves ignitability of the propellant and also provides a sustained burn rate.

Referring again to FIGS. 1 and 2, an aperture 22 is formed in cap 16 for receiving an igniter assembly 22 therein. Igniter assembly 24 is positioned and secured to cap 16 so as to enable operative communication between combustion chamber 18 and an igniter incorporated into the igniter assembly, for igniting gas generant 20 upon activation of the gas generator. Igniter assembly 24 may be secured in aperture 22 using anyone of several known methods, for example, by welding, using an interference fit, or by adhesive application. An igniter assembly suitable for the application described herein may be obtained from any of a variety of known sources, for example Primex Technologies, Inc. of Redmond, Wash. or Aerospace Propulsion Products bv, of The Netherlands.

In the embodiment shown in FIGS. 1 and 2, cap 16 if affixed to base 14 using an adhesive composition 30 appropriately positioned to affix cap 16 to base 14, thereby eliminating the need for welding. Adhesive composition 30 is applied to base 14 and/or cap 16 along an interface formed between base wall 14b and cap wall 16b when base wall 14b is received within cap wall 16b. In accordance with the present invention, adhesive composition 30 preferably has a decomposition temperature of about 110°-120° C. More generally, the decomposition temperature of adhesive composition 30 is preferably below the auto-ignition temperature of gas generant composition 20 (about 150° C., for example). As used herein, the term "decomposition temperature" refers to the minimum temperature, at a given initial pressure, required to initiate self-sustained decomposition of the adhesive composition. Providing an adhesive composition having a lower decomposition temperature than the auto-ignition temperature of the gas generant composition facilitates venting of the inflator 10, should gas generant composition 20 auto-ignite at slightly higher relative temperatures. Stated another way, as the ambient temperature increases, the seal provided by adhesive composition 30 at various part interfaces decomposes prior to auto-ignition of the adhesive composition, thereby preventing any inadvertent rupture of gas generator 10. Overall system safely is thereby enhanced.

Exemplary adhesives, generally two-part epoxies, are provided by Vantico, Inc. of East Lansing, Mich. under the trade names of ARALDITE® AW 8595/HARDENER HW-8595, EPIBOND 1590-A and 1590-B, and ARADALITE® 2014. Other exemplary adhesives include those provided by 3M Corporation of Minneapolis, Minn. under the trade names of 2214 Regular, 2214 Hi-Dense, 2214 Hi-Flex, 2214 Hi-Temp, 2214 Non-Metallic Filled, DP 460 Off-White and DP 420 Off-White. The adhesive composition should be applied and used in accordance with manufacturer instructions and recommendations.

Referring again to FIGS. 1 and 2, an annular metallic mesh filter 42 may be provided for filtration and cooling of combustion products. Filter 42 is radially spaced apart from base wall 14b and cap wall 16b, for filtering particulate materials produced during combustion of gas generant composition 20, and for serving as a heat sink for hot combustion products. Filter 42 has a length L1. Suitable metallic mesh is readily obtainable from suppliers such as Wayne Wire, Inc., of Kalkaska, Mich. A plenum 41 is formed between base wall 16b and filter 42, thereby providing a fluid flow channel upon gas generant combustion.

A ring 44, preferably formed from a metal or metal alloy, is oriented radially inwardly of filter 42. Ring 44 is preferably press fit within filter 42 and has a length L2 which is less than length L1 of filter 42, thereby blocking off a portion of the filter during combustion of the gas generant, causing combustion gases to be directed around an end portion of ring 44 and into filter 42. The combustion products are then directed through filter 42 and through plenum 41 to first end portions 46 of enclosed passages 36.

Finally, in further accordance with the present invention, crimped fasteners (not shown) may be employed about the interface of cap 14 and base 16 to enhance the strength of the housing 12 at the cap/base juncture. For example, the TOX Sheet Metal Joining System, supplied by TOX/PRESSO-TECHNIK of Warrenville, Ill. includes tooling adapted for crimping together portions of base 14 and cap 16.

To assemble the inflator 10, gas generant 20 is hermetically sealed within a pouch 40 formed from a material (for example, Mylar®) that is substantially moisture and gas impermeable, as previously described. Pouch 40 is then inserted into cap 16. When affixing cap 16 to base 14, adhesive composition 30 is first applied to the inner surface of cap wall 16b and/or the outer surface of base wall 14b. In the same way adhesive 30 may be applied to an interface formed between igniter assembly 24 and the cap 16. Igniter assembly 24 is then press fit within cap aperture 22. Cap 16 and base 14 are then nested together as shown in FIGS. 1 and 2. The adhesive is then preferably cured at temperatures suitable for curing the particular adhesive composition being used. Accelerated curing of the adhesive is preferably achieved through inductive heating of one or both of base 14 and cap 16. Other known cure methods at cure schedules tailored thereto may be employed. However, any curing procedure used is preferably conducted at a temperature below the auto-ignition temperature of gas generant 20, and is consistent with adhesive manufacturer recommendations. A silicone composition (not shown) may be applied to seal passages 36, thereby replacing seals typically used and providing for pressurization of the combustion chamber during combustion.

The gas generator described herein offers several advantages over existing designs. There is no need to pierce holes in cap 16 and base 14, thereby reducing punch wear and breakage. Also, no special orientation between the base and the cap is necessary with regard to alignment of respective pierced gas exit orifices during assembly. Furthermore, the elimination of punched holes along the housing portions provides a greater interfacial surface area for adhesive application between base 14 and cap 16, thereby enabling a stronger adhesive bond between the cap and base. In addition, the gases generated by combustion of gas generant 20 are cooled as they travel along the length of housing 12 and through filter 42 prior to exiting the gas generator, rather than simply traveling radially outward, as in other designs.

Figure 5:
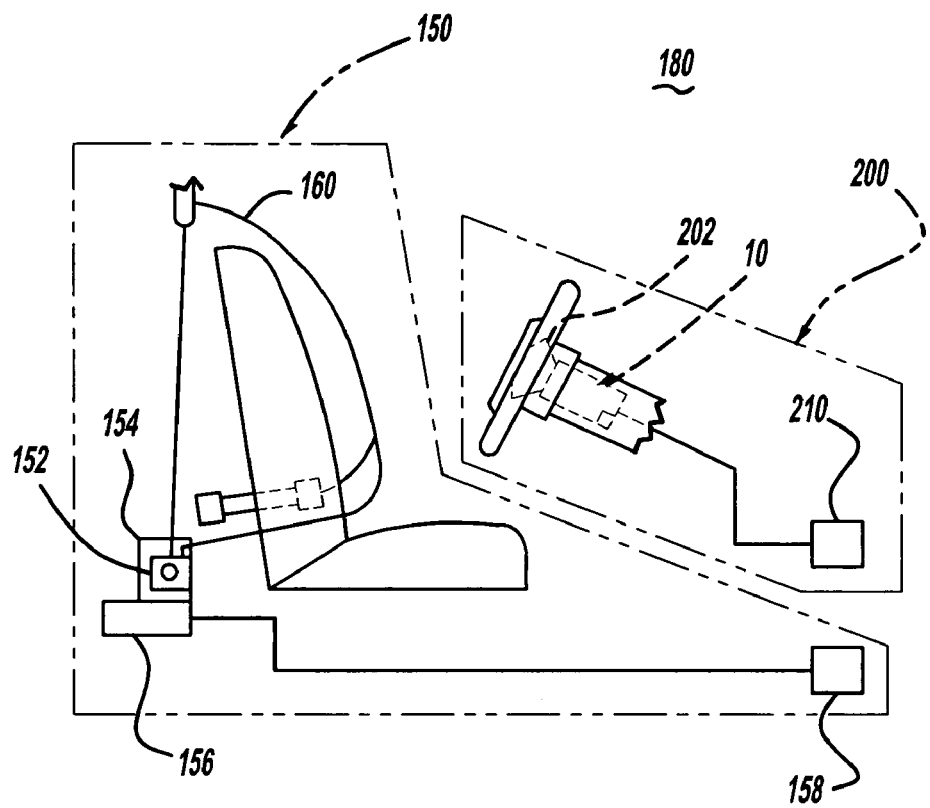
FIG. 5 is a schematic representation of an exemplary vehicle occupant protection system incorporating a gas generating system in accordance with the present invention.

Referring now to FIG. 5, any of the gas generating system embodiments described above may also be incorporated into an airbag system 200. Airbag system 200 includes at least one airbag 202 and a gas generating system 10 in accordance with the present invention coupled to airbag 202 so as to enable fluid communication with an interior of the airbag. Airbag system 200 may also be in communication with a crash event sensor 210 which communicates with a known crash sensor algorithm that signals actuation of airbag system 200 via, for example, activation of igniter assembly 22 (not shown in FIG. 5) in the event of a collision.

Referring again to FIG. 5, airbag system 200 may also be incorporated into a broader, more comprehensive vehicle occupant protection system 180 including additional elements such as a safety belt assembly 150. FIG. 5 shows a schematic diagram of one exemplary embodiment of such a restraint system. Safety belt assembly 150 may include a safety belt housing 152 and a safety belt 10 in accordance with the present invention extending from housing 152. A safety belt retractor mechanism 154 (for example, a spring-loaded mechanism) may be coupled to an end portion of the belt. In addition, a safety belt pretensioner 156 may be coupled to belt refractor mechanism 154 to actuate the retractor mechanism in the event of a collision. Typical safety belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may be in communication with a crash event sensor 158 (for example, an inertia sensor or an accelerometer) which communicates with a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A gas generating system comprising:
   a first member; and
   a second member, one of the first member and the second member having at least one groove formed therealong to enable fluid communication between a combustion chamber and an exterior of the gas generating system, the other one of the first member and the second member covering the at least one groove to define an at least one enclosed passage extending along the at least one groove for enabling fluid communication between the combustion chamber and the exterior of the gas generating system, wherein an end of the passage leads directly to the exterior of the gas generating system.

2. The gas generating system of claim 1 wherein at least a portion of one of the first member and the second member is received within the other of the first member and the second member.

3. The gas generating system of claim 2 wherein the other of the first member and the second member covers the groove.

4. The gas generating system of claim 3 further comprising a filter spaced apart from a portion of one of the first member and the second member received within the other of the first member and the second member to form a plenum between the filter and the portion.

5. The gas generating system of claim 2 wherein the portion of one of the first member and the second member received within the other of the first member and the second member covers the groove.

6. The gas generating system of claim 2 further comprising an adhesive composition positioned to secure the second member to the first member, and further comprising a gas generant composition having an auto-ignition temperature and wherein the adhesive composition has a decomposition temperature, the decomposition temperature being lower than the auto-ignition temperature.

7. The gas generating system of claim 6 wherein the adhesive composition is positioned intermediate the at least a portion of one of the first member and the second member received within the other of the first member and the second member, and the other of the first member and the second member.

8. The gas generating system of claim 1 wherein an end portion of the enclosed passage is positioned proximate a first end of the gas generating system, and wherein the gas generating system further comprises a third member positioned intermediate the combustion chamber and the end portion of the enclosed passage for directing a flow of combustion products toward a second end of the gas generator opposite the first end of the gas generator.

9. The gas generating system of claim 1 wherein the groove is substantially straight.

10. A vehicle occupant protection system comprising:
    an airbag system including an airbag and a gas generating system in accordance with claim 1.

11. The vehicle occupant protection system of claim 10 further comprising a crash event sensor in communication with a crash sensor algorithm for signaling activation of the airbag system.

12. The vehicle occupant protection system of claim 10 further comprising a safety belt assembly including at least one safety belt.

13. The vehicle occupant protection system of claim 10 further comprising a safety belt retractor mechanism be coupled to the at least one safety belt, and a safety belt pretensioner mechanism coupled to belt retractor mechanism for actuating the belt retractor mechanism.

14. The gas generating system of claim 1 wherein the at least one groove is shaped to provide a tortuous fluid flow passage between the combustion chamber and the exterior of the combustion chamber.

15. The gas generating system of claim 1 wherein the first member has a circumferential edge, the second member has a circumferential edge, and wherein a first end of the passage is partially defined by a portion of the circumferential edge of the first member and a second end of the passage is partially defined by a portion of the circumferential edge of the second member.

16. A gas generating system comprising:
    a first member;
    a second member;
    an adhesive composition securing the second member to the first member, the adhesive composition having a decomposition temperature; and
    a gas generant composition having an auto-ignition temperature, the decomposition temperature being lower than the auto-ignition temperature,
    one of the first member and the second member having at least one groove formed therealong, the other one of the first member and the second member covering the at least one groove to define at least one enclosed passage extending from an interior of the gas generating system to an exterior of the system.

17. The gas generating system of claim 16 wherein at least a portion of one of the first member and the second member is received within the other of the first member and the second member.

18. The gas generating system of claim 17 wherein the adhesive composition is positioned intermediate the at least a portion of one of the first member and the second member received within the other of the first member and the second member, and the other of the first member and the second member.

19. The gas generating system of claim 1 wherein one of the first member and the second member has at least one groove formed therealong to enable fluid communication between a combustion chamber and an exterior of the combustion chamber, and the other one of the first member and the second member covers the at least one groove to define an enclosed passage extending along the at least one groove between the combustion chamber and the exterior of the combustion chamber.

20. A method for manufacturing a gas generating system comprising the steps of:
   providing a first member having at least one groove formed therealong;
   providing a second member adapted for affixation to the first member; and
   affixing the second member to the first member such that at least a portion of the second member covers the at least one groove in the first member, thereby defining at least one enclosed passage extending along the at least one groove for enabling fluid communication between an interior of the gas generating system and an exterior of the gas generating system, wherein an end of the passage leads directly to the exterior of the gas generating system.

21. The method of claim 20 further comprising the steps of:
   positioning a quantity of a gas generant composition in the gas generator so as to enable fluid communication between the gas generant composition and the at least one passage, the gas generant having a predetermined auto-ignition temperature, and
   wherein the step affixing the second member to the first member comprises the steps of:
   providing an adhesive composition having a predetermined decomposition temperature, the decomposition temperature being lower than the auto-ignition temperature of the gas generant composition;
   applying the adhesive composition to at least one of the first member and the second member; and
   applying the second member to the first member such that the adhesive composition is interposed between the first member and the second member to affix the second member to the first member.

* * * * *

UNITED STATES PATENT AND TRADEMARK OFFICE
CERTIFICATE OF CORRECTION

PATENT NO.        : 7,438,315 B2
APPLICATION NO.   : 11/140055
DATED             : October 21, 2008
INVENTOR(S)       : Blackburn It is certified that error appears in the above-identified patent and that said Letters Patent is hereby corrected as shown below:

Column 4; Line 62; delete "perchiorates" and insert --perchlorates--

Column 5; Line 1; delete "perchiorates" and insert --perchlorates--

Column 7; Line 13; delete "anyone" and insert --any one--

Signed and Sealed this

Thirtieth Day of December, 2008

JON W. DUDAS
*Director of the United States Patent and Trademark Office*